(12) United States Patent
Gu et al.

(10) Patent No.: US 10,191,568 B2
(45) Date of Patent: Jan. 29, 2019

(54) DEFORMABLE INPUT DEVICE

(71) Applicant: Microsoft Technology Licensing, LLC, Redmond, WA (US)

(72) Inventors: Jiawei Gu, Shanghai (CN); Xin Liu, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 24 days.

(21) Appl. No.: 15/086,721

(22) PCT Filed: Oct. 8, 2013

(86) PCT No.: PCT/CN2013/084825
§ 371 (c)(1),
(2) Date: Mar. 31, 2016

(87) PCT Pub. No.: WO2015/051489
PCT Pub. Date: Apr. 16, 2015

(65) Prior Publication Data
US 2016/0231833 A1 Aug. 11, 2016

(51) Int. Cl.
*G06F 3/0354* (2013.01)
(52) U.S. Cl.
CPC .................. *G06F 3/03545* (2013.01)
(58) Field of Classification Search
CPC ...... G06F 3/03545; G06F 3/041; G06F 3/044; G06F 3/0383; G06F 3/04883; G06F 3/0488; G06T 11/001; G06T 11/203
USPC ......................................................... 345/179
See application file for complete search history.

(56) References Cited

U.S. PATENT DOCUMENTS

| 4,532,376 A | 7/1985 | Rockwell |
| 6,957,923 B2 | 10/2005 | Lapstun et al. |
| 8,487,963 B1 * | 7/2013 | Harris .................... G06T 11/00 345/619 |
| 2002/0118174 A1 | 8/2002 | Rodgers |
| 2006/0007123 A1 | 1/2006 | Wilson et al. |

(Continued)

FOREIGN PATENT DOCUMENTS

| CN | 2622763 Y | 6/2004 |
| CN | 2643392 Y | 9/2004 |

(Continued)

OTHER PUBLICATIONS

Baxter et al., "DAB: Interactive Haptic Painting with 3D Virtual Brushes," published Aug. 12, 2001, In Proceedings of the 28th Annual Conference on Computer Graphics and Interactive Techniques, retrieved at <<http://dl.acm.org/citation.cfm?id=383313>> 8 pages.
Butler et al., "HabilisDraw DT: A Bimanual Tool-Based Direct Manipulation Drawing Environment," published Apr. 24, 2004, In International Conference for Human-Computer Interaction, retrieved at <<http://citeseerx.ist.psu.edu/viewdoc/download?rep=rep1&type=pdf&doi=10.1.1.69.9641>> 4 pages.
De Macedo et al., "Art Making Using an Haptic Device for Interactive Digital Painting," published Apr. 27, 2013, In Proceedings of the XV Symposium on Virtual and Augmented Reality, retrieved at <<http://dl.acm.org/citation.cfm?id=2511545&preflayout=tabs>> 2 pages.

(Continued)

*Primary Examiner* — Fred Tzeng
(74) *Attorney, Agent, or Firm* — Schwegman Lundberg & Woessner, P.A.

(57) ABSTRACT

An input device include a deformable tip that is adjustable to define a shape tip configuration. Exemplary tip shapes may include multiple types of oil brushes or a Chinese brush, among other alternatives. In some cases, the deformable tip may be more rigid in a jammed tip configuration in which solid particles in a membrane are jammed together using a vacuum pump. In some examples, at least a portion of the deformable tip may be illuminated in a color to be used in the digital painting application.

20 Claims, 18 Drawing Sheets

(56) References Cited

U.S. PATENT DOCUMENTS

| | | | |
|---|---|---|---|
| 2007/0188478 | A1 | 8/2007 | Silverstein et al. |
| 2009/0135149 | A1 | 5/2009 | Taniuchi |
| 2010/0051356 | A1* | 3/2010 | Stern ................ G06F 3/03545 178/19.04 |
| 2011/0169756 | A1* | 7/2011 | Ogawa ............... G06F 3/03545 345/173 |
| 2011/0304651 | A1* | 12/2011 | Shimura ............ G06F 3/03545 345/661 |
| 2012/0182271 | A1 | 7/2012 | Wu et al. |
| 2013/0120281 | A1* | 5/2013 | Harris ................ G06F 3/04883 345/173 |
| 2013/0120433 | A1* | 5/2013 | DiVerdi .............. G06T 11/001 345/593 |
| 2013/0229389 | A1* | 9/2013 | DiVerdi ............... G06F 3/0488 345/179 |
| 2013/0229390 | A1* | 9/2013 | DiVerdi ............... G06F 3/0488 345/179 |
| 2014/0028634 | A1* | 1/2014 | Krah .................... G06F 3/041 345/179 |
| 2014/0081610 | A1* | 3/2014 | DiVerdi ............... G06T 11/203 703/6 |
| 2014/0133134 | A1* | 5/2014 | Kim .................... G06F 3/03545 362/109 |
| 2014/0176495 | A1* | 6/2014 | Vlasov ................ G06F 3/03545 345/174 |
| 2014/0210744 | A1* | 7/2014 | Song ................... G06F 3/03545 345/173 |
| 2014/0253522 | A1* | 9/2014 | Cueto ................. G06F 3/03545 345/179 |
| 2015/0054757 | A1* | 2/2015 | Kuroda ............... G06F 3/03545 345/173 |
| 2015/0193026 | A1* | 7/2015 | Handa ................ G06F 3/03545 345/179 |
| 2015/0212600 | A1* | 7/2015 | Zerayohannes ..... G06F 3/03545 345/179 |
| 2015/0212601 | A1* | 7/2015 | Zerayohannes ..... G06F 3/03545 345/179 |
| 2016/0070371 | A1* | 3/2016 | Oonishi ............... G06F 3/044 345/174 |
| 2016/0162045 | A1* | 6/2016 | Vincent .............. G06F 3/0383 345/179 |
| 2016/0266666 | A1* | 9/2016 | Shah ................... G06F 3/03545 |
| 2016/0349897 | A1* | 12/2016 | Ishikawa ............ G06F 3/044 |

FOREIGN PATENT DOCUMENTS

| | | |
|---|---|---|
| CN | 101598979 A | 12/2009 |
| CN | 202904497 U | 4/2013 |
| CN | 103210457 A | 7/2013 |
| TW | M241752 U | 8/2004 |
| WO | WO2012063615 | 5/2012 |

OTHER PUBLICATIONS

Follmer et al., "Jamming User Interfaces: Programmable Particle Stiffness and Sensing for Malleable and Shape-Changing Devices," published Oct. 7, 2012, In Proceedings of the 25th Annual ACM Symposium on User Interface Software and Technology, retrieved at <<http://dl.acm.org/citation.cfm?id=2380181>> 10 pages.

Kamuro et al., "Pen de Touch," published Aug. 3, 2009, In Proceedings of ACM SIGGRAPH, retrieved at <<http://delivery.acm.org/10.1145/1600000/1597973/a17-kamuro.pdf?ip=203.8.109.15&id=1597973&acc=ACTIVE%20SERVICE&key=C2716FEBFA981EF1193B1DAAE4F8BDAFA31CC7C692744019&CFID=367453683&CFTOKEN=17205312&_acm_=1380884367_bdaef8f415202888f9d7e901d4981bd0>> 1 page.

Otsuki et al., MAI Painting Brush: An Interactive Device that Realizes the Feeling of Real Painting, published Oct. 16, 2011, In Proceedings of the 23nd Annual ACM Symposium on User Interface Software and Technology, retrieved at <<http://dl.acm.org/citation.cfm?id=1866045>> 4 pages.

PCT Search Report and Written Opinion dated Jul. 9, 2014 for PCT Application No. PCT/CN2013/084825, 13 pages.

SensuBrush, retrieved on Oct. 4, 2013 at <<http://www.sensubrush.com>> 1 page.

Sugihara et al., "MAI Painting Brush++: Augmenting the Feeling of Painting with New Visual and Tactile Feedback Mechanisms," published Oct. 16, 2011, In Proceedings of Annual ACM Symposium on User Interface Software and Technology, retrieved at <<http://www.rm.is.ritsumei.ac.jp/~tamura/paper/sugihara[1].pdf>> 2 pages.

Vandoren et al., "Intupaint: Bridging the Gap between Physical and Digital Painting," published Oct. 1, 2008, In IEEE International Workshop on Horizontal Interactive Human Computer System, retrieved at <<http://ieeexplore.ieee.org/stamp/stamp.jsp?tp=&arnumber=4660185>> 8 pages.

The European Office Action dated Oct. 12, 2016 for European Patent Application No. 13895295.7, a counterpart foreign application of U.S. Appl. No. 15/086,721, 9 pages.

The Supplementary European Search Report dated Sep. 2, 2016 for European Patent Application No. 13895295.7, 7 pages.

"First Office Action and Search Report Issued in Chinese Patent Application No. 201380080155.4", dated Jan. 25, 2018, 11 Pages.

"Second Office Action Issued in Chinese Patent Application No. 201380080155.4", dated Jun. 13, 2018, 12 Pages.

"Office Action Issued in Chinese Patent Application No. 201380080155.4", dated Sep. 9, 2018, 12 Pages.

* cited by examiner

1500 ⟶

```
┌─────────────────────────────────────────────────────────────┐
│ RECEIVE, VIA A USER INTERFACE OF A DIGITAL PAINTING         │
│ APPLICATION, A SELECTION OF A COLOR TO BE USED IN THE       │
│ DIGITAL PAINTING APPLICATION                                │
│                            1502                             │
└─────────────────────────────────────────────────────────────┘
                              │
                              ▼
┌─────────────────────────────────────────────────────────────┐
│ PROVIDE INFORMATION ASSOCIATED WITH THE SELECTED COLOR TO   │
│ AN INPUT DEVICE THAT INCLUDES A DEFORMABLE TIP, AT LEAST A  │
│ PORTION OF THE DEFORMABLE SHAPE TIP TO BE ILLUMINATED IN    │
│ THE SELECTED COLOR                                          │
│                            1504                             │
└─────────────────────────────────────────────────────────────┘
```

RECEIVE, AT AN INPUT DEVICE INCLUDING A DEFORMABLE TIP, AN INPUT TO ADJUST A HARDNESS OF THE DEFORMABLE TIP
1702

IN RESPONSE TO RECEIVING THE INPUT, ADJUST THE HARDNESS OF THE DEFORMABLE TIP FROM A FIRST TIP CONFIGURATION TO A SECOND TIP CONFIGURATION THAT IS MORE RIGID THAN THE FIRST TIP CONFIGURATION
1704

FIG. 17

DEFORMABLE INPUT DEVICE

This application is a national stage application of International Patent Application No. PCT/CN2013/084825, filed Oct. 8, 2013, which application is hereby incorporated by reference in its entirety.

BACKGROUND

Modern computer graphics have allowed for some truly artistic creations on digital platforms and have provided a large gallery of paint functions and features. However, the painting experience includes more than just visual results, but also requires physical manipulation of brushes in the actual painting process. The viscosity, friction and the bending force associated with the physical manipulation may provide rich information to users, varying with different input possibilities/forms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Some implementations provide an input device (e.g., for a digital painting application) that includes a deformable tip that is adjustable to define a shape tip configuration (e.g., an oil brush tip configuration). In some implementations, the deformable tip may be more rigid in a jammed tip configuration in which solid particles in a membrane are jammed together using a vacuum pump, for example.

Some implementations provide techniques and arrangements for illuminating at least a portion of the deformable tip in a color corresponding to a color that is selected to be used in an application (e.g., a digital painting application, a game, a notes application, etc.).

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

FIG. 15 illustrates an example process flow for providing information associated with a selected color to an input device for illumination based on the selected color, according to some implementations.

FIG. 17 illustrates an example process flow for adjusting a hardness of a deformable tip of an input device from a first tip configuration to a second tip configuration that is more rigid than the first tip configuration, according to some implementations.

DETAILED DESCRIPTION

Overview

Digital painting software may provide a user with the ability to simulate various visual effects based on different selectable stroke types (e.g., charcoal pencil, oil painting, watercolor, etc.). A stylus may assist the user in drawing with high accuracy, and pressure sensing may be available. However, digital painting software may not support changes in brush stroke, as a stylus or fingertip cannot change its shape, compared to different types and strokes of real painting brushes.

The present disclosure describes an input device with a deformable shape-changing tip that simulates a real paint brush, providing better and new digital drawing experiences for users. In some implementations, a "jamming" structure which may be controlled to provide different levels of stiffness. When the tip is soft and deformable, a user may be able to easily shape the tip and define a unique tip pattern. In some cases, a vacuum pump may be used to fix the tip shape customized by the user when the tip is deformable. For example, solid particles within a membrane may be "jammed" together such that the particles behave in a solid-like manner, similar to coffee particles under vacuum in a coffee bag. The degree of hardening or jamming may be variable, depending on the desired hardness of the tip for a given application.

Example Implementations

Figure 1:
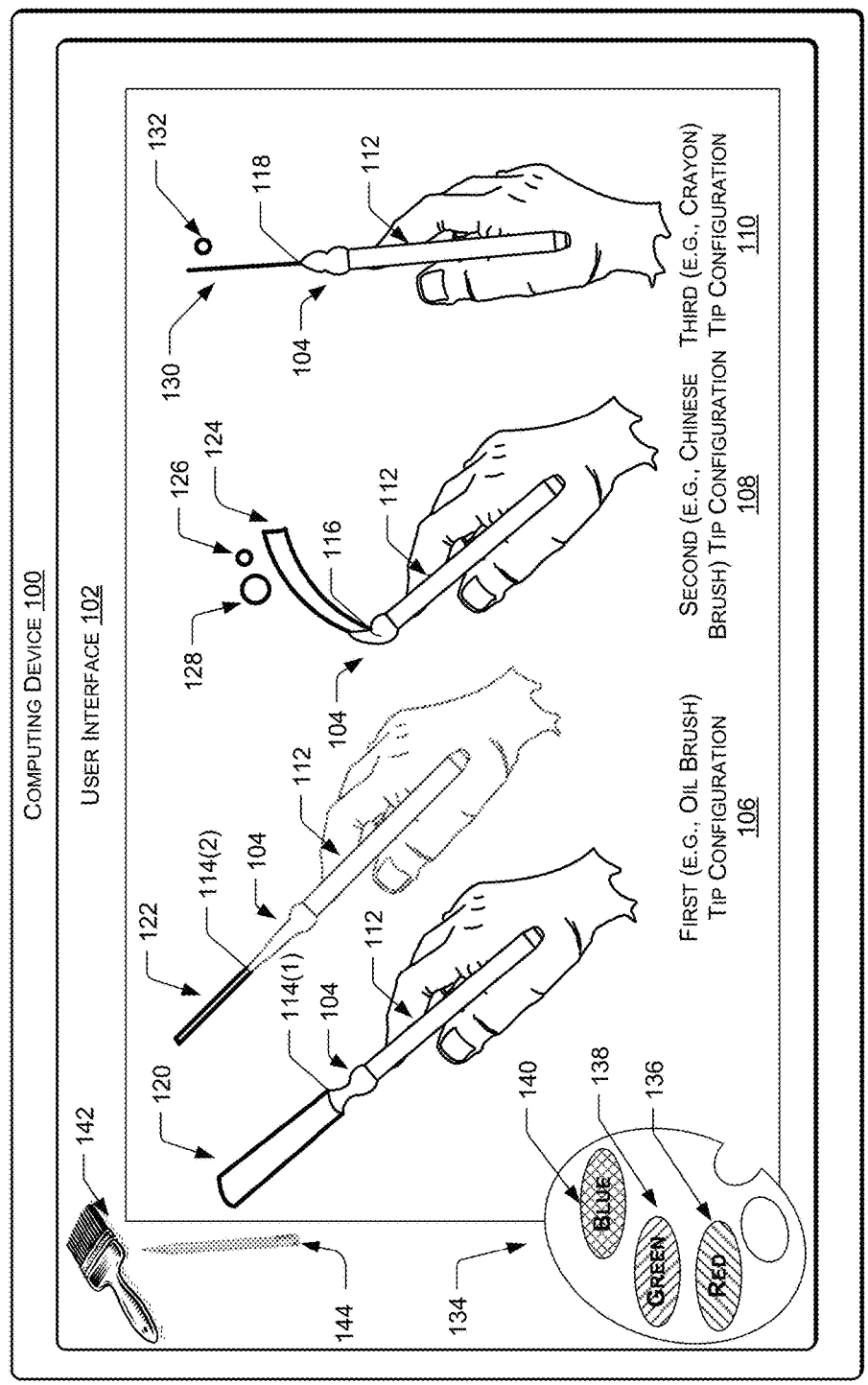
FIG. 1 illustrates an example of a user interface associated with a digital painting application, according to some implementations.

FIG. 1 illustrates a computing device 100 that may be configured to present an exemplary user interface 102 associated with an electronic painting application. An input device (e.g., a stylus) may include a deformable tip 104 that may allow a user to customize a tip pattern for a particular painting application (e.g., for oil brush painting, Chinese brush painting, etc.). For example, FIG. 1 illustrates a first tip configuration 106, a second tip configuration 108, and a third tip configuration 110. However, numerous other tip configurations are possible that may allow the user to create various brush stroke sizes, shapes, and/or patterns. In some cases, the deformable tip 104 may be attached or otherwise connected to a stylus 112 and may include a jamming structure (see e.g., FIG. 2) to adjust a tip stiffness. When the deformable tip 104 remains deformable (see e.g., the unjammed tip configuration 202 in FIG. 2), the user may shape the deformable tip 104 in order to customize a tip pattern for the desired painting application. As an illustrative non-limiting example, after the user has shaped the deformable tip 104, a vacuum pump may be used to fix or hold the customized deformed shape of the deformable tip 104 in a state to maintain the desired tip pattern (see e.g., the jammed tip configuration 204 in FIG. 2). The state may be rigid, semi-rigid, flexible or a more tightly packed, but still deformable shape.

Referring to FIG. 1, the first tip configuration 106 may be associated with an oil brush tip configuration to allow the user to shape a stroke pattern to mimic a brush stroke pattern that may be possible when painting with an oil brush on paper or canvas. An oil brush allows a painter to create wide or narrow strokes depending on a contact area of the brush and a movement angle of the brush. For example, an oil brush may have a "wide" side that may be used to create wide strokes and a "narrow" side to create narrow strokes.

Figure 3:
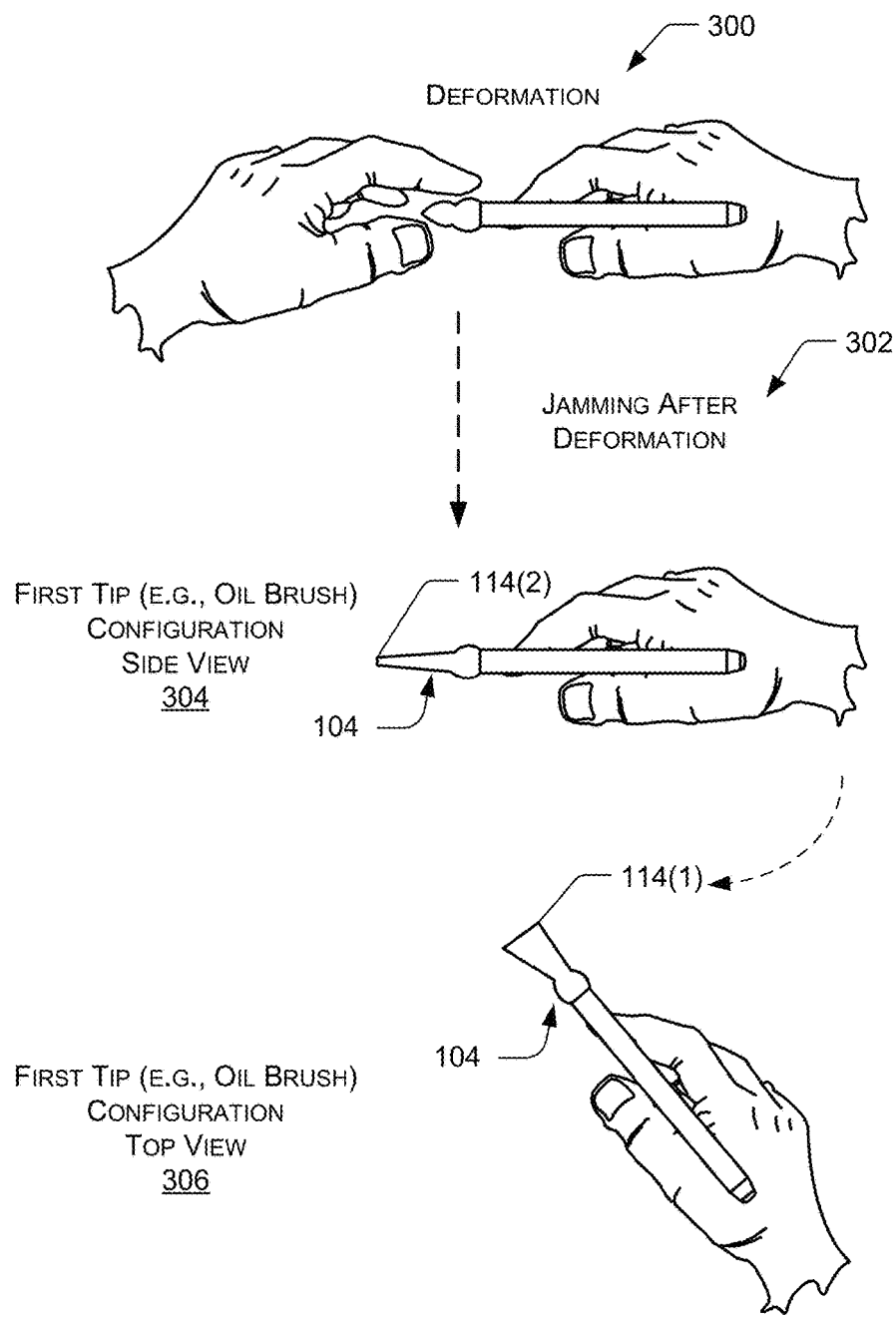
FIG. 3 illustrates an example of a tip shape that is deformed and jammed after deformation, according to some implementations.

FIG. 1 illustrates a first oil brush tip shape 114(1) that corresponds to a view of a wide side of the deformable tip 104 (see e.g., the first oil brush tip configuration top view 306 in FIG. 3). A second oil brush tip shape 114(2) corresponds to a narrow side of the deformable tip 104 (see e.g., the first oil brush tip configuration side view 304 in FIG. 3). When the user orients the stylus 112 such that the first oil brush tip shape 114(1) defines a contact area, a wide stroke pattern 120 may be created. When the user orients the stylus 112 such that the second oil brush tip shape 114(2) defines a contact area, a narrow stroke pattern 122 may be created.

In some implementations, the computing device 100 may use an infrared sensing system to provide access to raw image data of the tip contact area on a screen. For example, infrared cameras may be used to sense objects, hand gestures, touch input, or a combination thereof. For each detected touch point, the computing device 100 may automatically draw a line through these points. The line may be constructed by many closely placed circles (or other shapes) filled with a particular color. Therefore, the width of the line may correspond to the diameter of the circles. The diameter may vary with the size of the touch area. In some cases, a touch area may be defined as an ellipse, and an average of a length of a major axis and a length of the minor axis may be used to define the diameter of a circle.

The second tip configuration 108 illustrated in FIG. 1 may be associated with a "Chinese brush" tip configuration to allow the user to mimic a stroke pattern that may be possible when painting with a Chinese brush on paper or canvas. A Chinese brush may include a brush tip that may be flexible like a hair brush. A Chinese brush allows a painter to create various brush stroke patterns depending on an amount of pressure applied by the user and an angle of movement of the brush tip. For example, a Chinese brush may have an elliptical shape, with a brush diameter increasing from an initial diameter at a base of the brush before decreasing to form a substantially pointed brush tip.

FIG. 1 illustrates that a variable stroke pattern 124 may depend on a deformity of the brush tip 104 that results from the user applying a particular amount of pressure and moving the tip 104 at a particular angle. In the second tip configuration 108, the deformable tip 104 may remain in a deformable state (see e.g., FIG. 6). As the deformable tip 104 remains deformable, the user may be provided with tactile feedback that simulates Chinese brush painting.

In the example of FIG. 1, the user has applied pressure to the deformable tip 104 and moved the stylus 112 in a semi-circular motion downward and to the left with respect to an initial contact point. Thus, the Chinese brush tip shape 116 is shown in FIG. 1 with the narrow tip of the Chinese brush oriented toward the initial contact point and the brush deformed at an angle associated with an amount of pressure applied by the user when moving the stylus 112 in the semi-circular motion. In the second tip configuration 108, various other tip shape deformities may be possible depending on the orientation of the stylus 112, a stroke angle, an amount of pressure applied by the user, and based on a stiffness (i.e., how tightly packed) of the deformable tip 104. Further, while not illustrated in FIG. 1, in some implementations, in the Chinese brush configuration 108, "airbrushes" may be used to display a spray of ink by painting pixels in a circular region around the contact area of the tip 104 (e.g., as shown at 1404 in FIG. 14).

As the Chinese brush tip shape 116 includes a substantially pointed tip, other shapes may be created. For example, when the stylus 112 is substantially perpendicular to a plane defined by the user interface 102, a substantially circular shape may be created, with a size of the circle determined based on an amount of pressure applied by the user. To illustrate, when the user applies a first amount of pressure, a small circular shape 126 may be created. When the user applies more pressure, a larger circular shape 128 may be created.

The third tip configuration 110 illustrated in FIG. 1 may correspond to a crayon tip shape 118, in which the deformable tip 104 may be jammed but not deformed. In the third tip configuration 110, the stroke pattern may include a fixed shape pattern (e.g., a fixed circle diameter). In contrast to the second tip configuration 108, in the third tip configuration 110, the jammed non-deformed rigid tip shape 118 may produce a fixed shape pattern 130 (e.g., a line with a fixed stroke pattern width corresponding to a fixed circle diameter) and may produce a fixed sized circle 132.

In the illustrative user interface 102 of FIG. 1, a color palette 134 may include a plurality of selectable colors. In FIG. 1, the color palette 134 includes a selectable red (R) color 136, a selectable green (G) color 138, and a selectable blue (B) color 140 (shown as different patterns in FIG. 1 for illustrative purposes only). However, alternative or additional colors may be included in the color palette 134. Further, the selectable colors may be mixed. To illustrate, a user may select the red color 136, the green color 138, the blue color 140, or a combination thereof, and the corresponding color may represent a combined RGB value. Further, it will be appreciated that other alternative methods of selecting a color may be provided.

In some cases, a color-picking function may be added to the deformable tip 104. For example, referring to FIG. 9, three lights (e.g., light emitting diodes) may be used to illuminate at least a portion of the deformable tip 104 using three primary colors (RGB). As an illustrative non-limiting example, the lights may be placed in a plastic ball for scattering and may be digitally controlled, mapping 0-3.3V to an RGB value (0-255). The associated voltages may be determined when the user selects one or more of the colors on the color palette 134. In some cases, the RGB values may be communicated from the computing device 100 to the stylus 112 via a wired or wireless connection (e.g., via Bluetooth, Wi-Fi, or infrared), and one or more of the lights may be illuminated in response.

In the illustrative example of FIG. 1, the user interface 102 also includes a selectable paint brush icon 142 and a selectable pencil/crayon icon 144. In some cases, selection of the paint brush icon 142 may result in the color palette 134 being displayed. Further, while not shown in FIG. 1, selection of the pencil/crayon icon 144 may result in a plurality of selectable colored crayons being displayed instead of the color palette 134.

Figure 2:
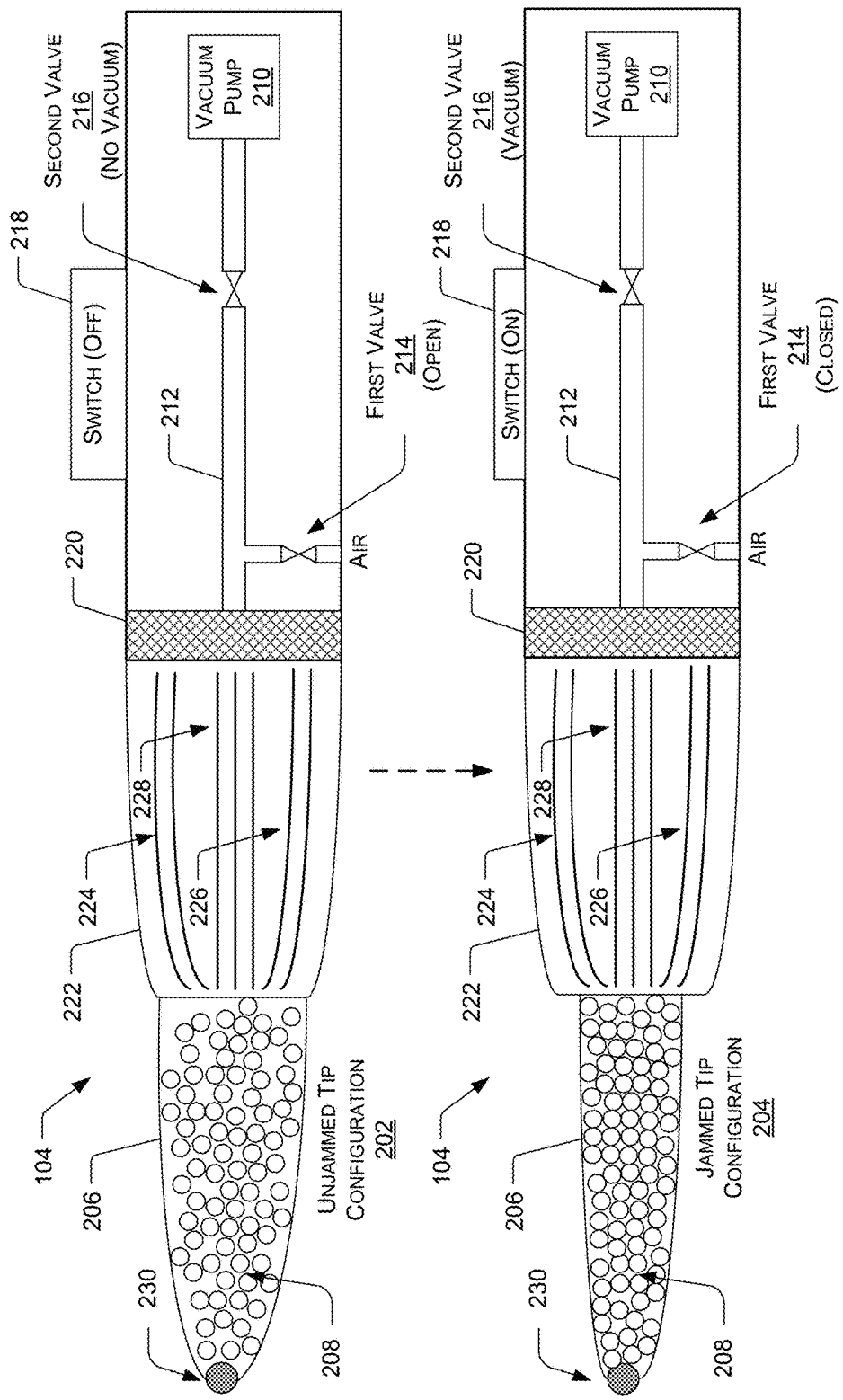
FIG. 2 illustrates an example of an input device having a tip shape that is adjustable between an unjammed tip configuration and a jammed tip configuration, according to some implementations.

Referring to FIG. 2, an example of a "jamming" mechanism that employs a vacuum to fix the deformable tip 104 in a particular configuration is illustrated, according to some implementations. However, alternative methods of controlling the stiffness and shape of the deformable tip 104 may also be used. For instance, an electromagnet may be used to fix particles or beads of ferromagnetic material, a robotic tip could be employed that is deformable, etc.

As used herein, the term "jamming" refers to a mechanism by which a material may transition between a liquid-like state and a solid-like state with little or no change in volume. Jamming is commonly experienced in products such as vacuum packed coffee which has a stiff "brick-like" state. When the package is punctured, air enters the package, the confining vacuum is released, and the coffee particles behave in a liquid-like manner. Jamming describes a situation when granular media exhibits a yield stress, such that forces can be distributed through chains of grains as if each chain were a rigid object. The effective "solid" phase is achieved when the vacuum results in the density of particles exceeding a threshold. Further, the tip configurations are reversible repeatedly, and a jamming condition is continuously variable to any desired level of hardness by adjusting vacuum pressure. As jamming is limited to physical changes without any chemical reagent, it may be considered safe and environmentally friendly.

In FIG. 2, particular components of the stylus 112 and associated deformable tip 104 of FIG. 1 are illustrated, according to some implementations. The components illustrated in FIG. 2 are for illustrative purposes only and numerous other implementations may include alternative, additional, or fewer components to effect a transition from an unjammed tip configuration 202 to a jammed tip configuration 204 (with the transition illustrated in FIG. 2 by a dashed line) or anywhere in between.

In the example of FIG. 2, the deformable shape tip 104 includes a substantially non-porous membrane 206 (e.g., elastic silicone rubber among other alternatives) that is filled with a plurality of solid particles 208 (e.g., crystal, glass, ceramic or plastic balls, among other alternatives). When the solid particles 208 are in a loosely packed state, the deformable shape tip 204 may be soft and deformable. A vacuum pump 210 may remove air (or other gas) from within the membrane 206 to jam the particles 208 into a solid-like, rigid state. The vacuum pump 210 may remove air via tubing 212 (e.g., flexible tubing), with a first valve 214 actuatable to allow air (e.g., at atmospheric pressure) into the tubing 212 and a second valve 216 that is actuatable to be closed after the vacuum pump 210 has removed the air from inside the membrane 206. That is, the vacuum pump 210 may power on to remove the air, remove the air, and then power off. While the vacuum pump 210 is illustrated in FIG. 2 as within the stylus 112, other configurations are also possible, including a separate vacuum pump that may be connected to the stylus 112. In some cases, the vacuum pump 210 may represent a manually actuated (i.e., non-powered) mechanical structure. As an illustrative example, for a sealed volume, the user may open a bellows structure (or other shape-deformable structure) to pull a vacuum in the tip 104 without electrical power.

In the unjammed tip configuration 202, the first valve 214 remains open to air (e.g., at atmospheric pressure) in order to allow the plurality of particles 208 to remain in a liquid-like state such that the deformable tip 104 remains flexible. In the example of FIG. 2, a switch 218 or other user actuatable control may be used to transition the deformable shape tip 104 between the unjammed tip configuration 202 and the jammed tip configuration 204, and vice versa.

In some cases, a filter 220 may be used to prevent the particles 208 from entering the tubing 212 when under vacuum. That is, the solid particles 208 may have a first size, and a size of the openings in the filter 220 may have a second size that is smaller in order to allow air within the membrane 206 to be removed, while preventing the particles 208 from entering the tubing 212. As an illustrative non-limiting example, the filter 220 may have a plurality of holes with a diameter of about 0.061 mm, and the particles 208 may have a diameter of about 0.1 mm.

The deformable tip 104 may be soft and deformable according to its materials, while a real brush has a relatively fixed form. Although the deformable tip 104 may be soft, the shape may remain pointed and like an ellipse. Further, a pencil, pen or crayon is characterized by a sharp tip. As the membrane 206 may be made of elastic silicone rubber, it may be difficult to obtain a sharp head on the deformable tip 104. Accordingly, in some embodiments, a soft jamming tip ball 230 may be added at the point of the deformable tip 104. Further, in order to simulate real brush haptic feedback, a second structure 222 may be disposed between the deformable tip 104 and the stylus 112. The second structure 222 may include a first set of flexible curved ribs 224, a second set of flexible curved ribs 226, and a set of flexible straight ribs 228 that may be used to guide the soft jamming tip ball 230 and provide haptic feedback to the user.

Thus, FIG. 2 illustrates an example of a mechanism of maintaining a stiffness of the deformable tip 104 in tip configurations that utilize a rigid tip for input (e.g., the oil brush tip configuration 106 and the crayon tip configuration 110).

FIG. 3 illustrates an example of deformation of the deformable tip 104 in order to place the deformable tip 104 into the oil brush tip configuration 106. In the oil brush tip configuration 106, a movement angle directly affects the contact angle, resulting in different shape patterns.

As shown at 300, the user may deform the deformable tip 104, and the deformable tip 104 may be jammed after deformation, at 302. For example, as described above with respect to FIG. 2, the vacuum pump 210 may fix the shape of the deformable tip 104 after deformation.

FIG. 3 illustrates a side view 304 of the oil brush tip configuration 106 and a top view 306 of the oil brush tip configuration 106 after the deformation 300 and the jamming 302. In the side view 304, the oil brush tip shape 114(1) corresponds to a view of a narrow side of the deformable tip 104. In the top view 306, the oil brush tip shape 114(2) corresponds to a view of a wide side of the deformable tip 104.

Figure 4:
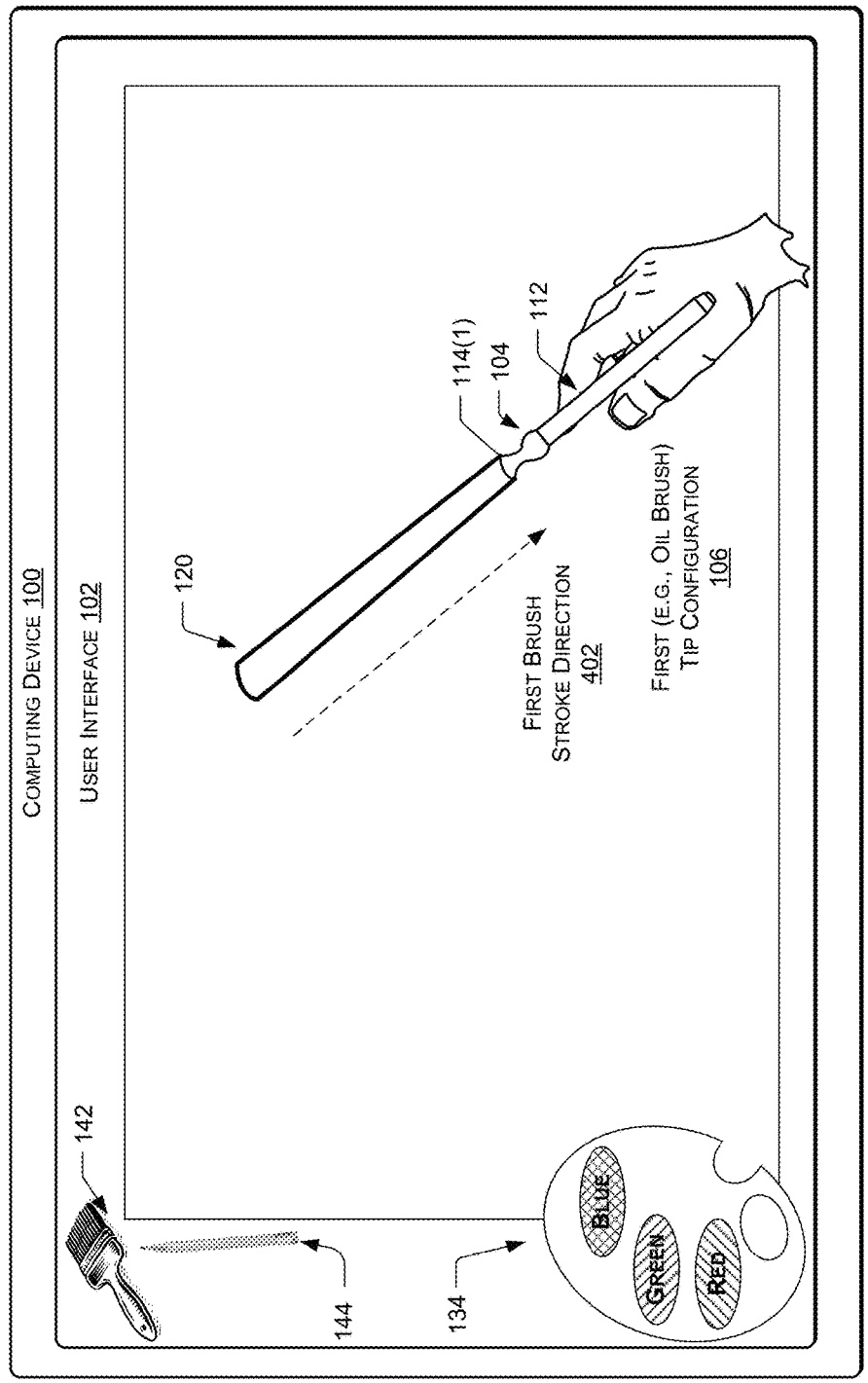
FIGS. 4 and 5 illustrate user interactions with the exemplary user interface with an input device having a tip shape that has been deformed and jammed after deformation (e.g., an oil brush tip configuration), according to some implementations.

FIG. 4 illustrates that when the user orients the stylus 112 such that oil brush tip shape 114(1) defines a contact area and moves the stylus 112 in a first brush stroke direction 402, the wide stroke pattern 120 may be created.

Figure 5:
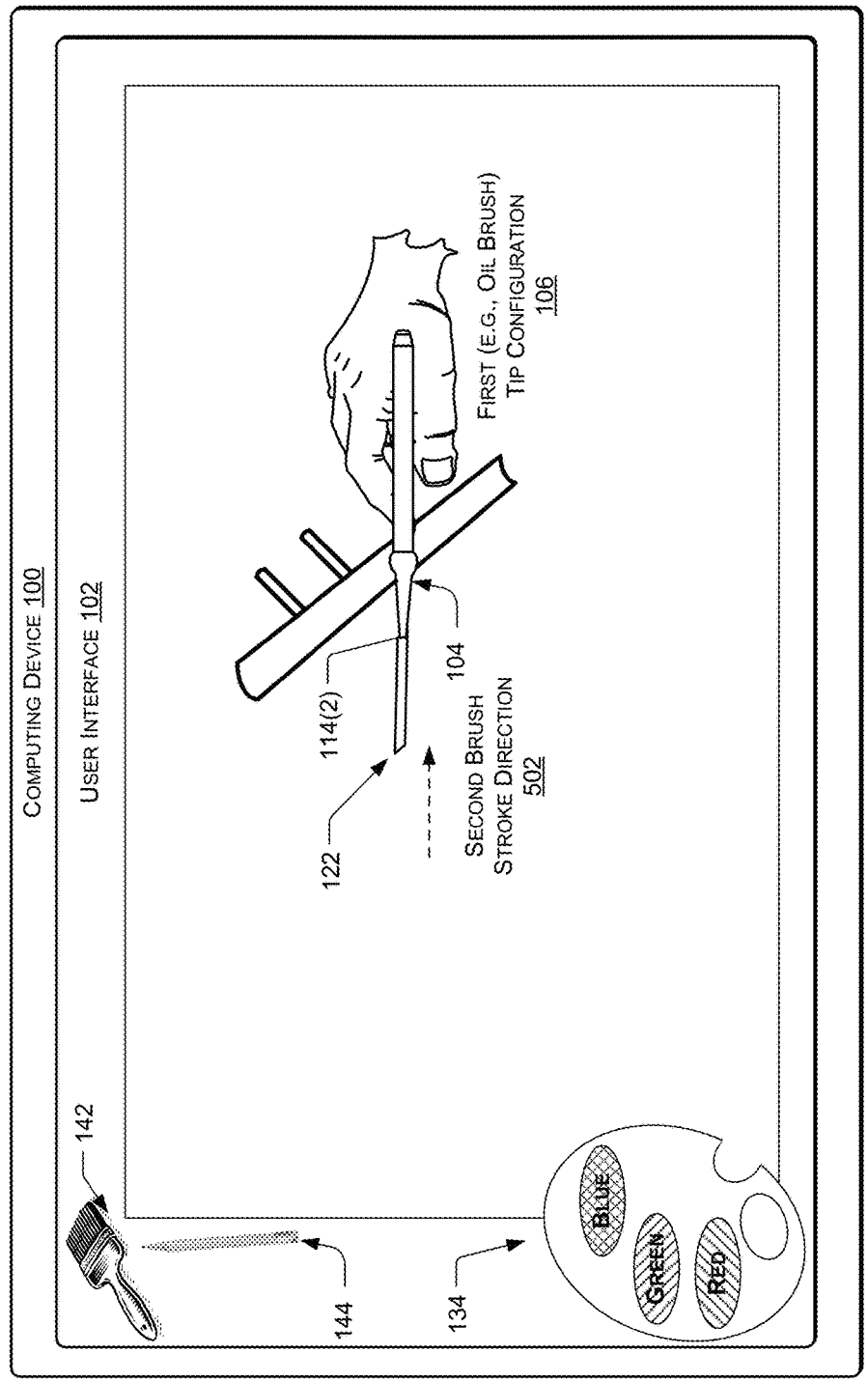

FIG. 5 illustrates that when the user orients the stylus 112 such that oil brush tip shape 114(2) defines a contact area and moves the stylus 112 in a second brush stroke direction 502, the narrow stroke pattern 122 may be created.

Figure 6:
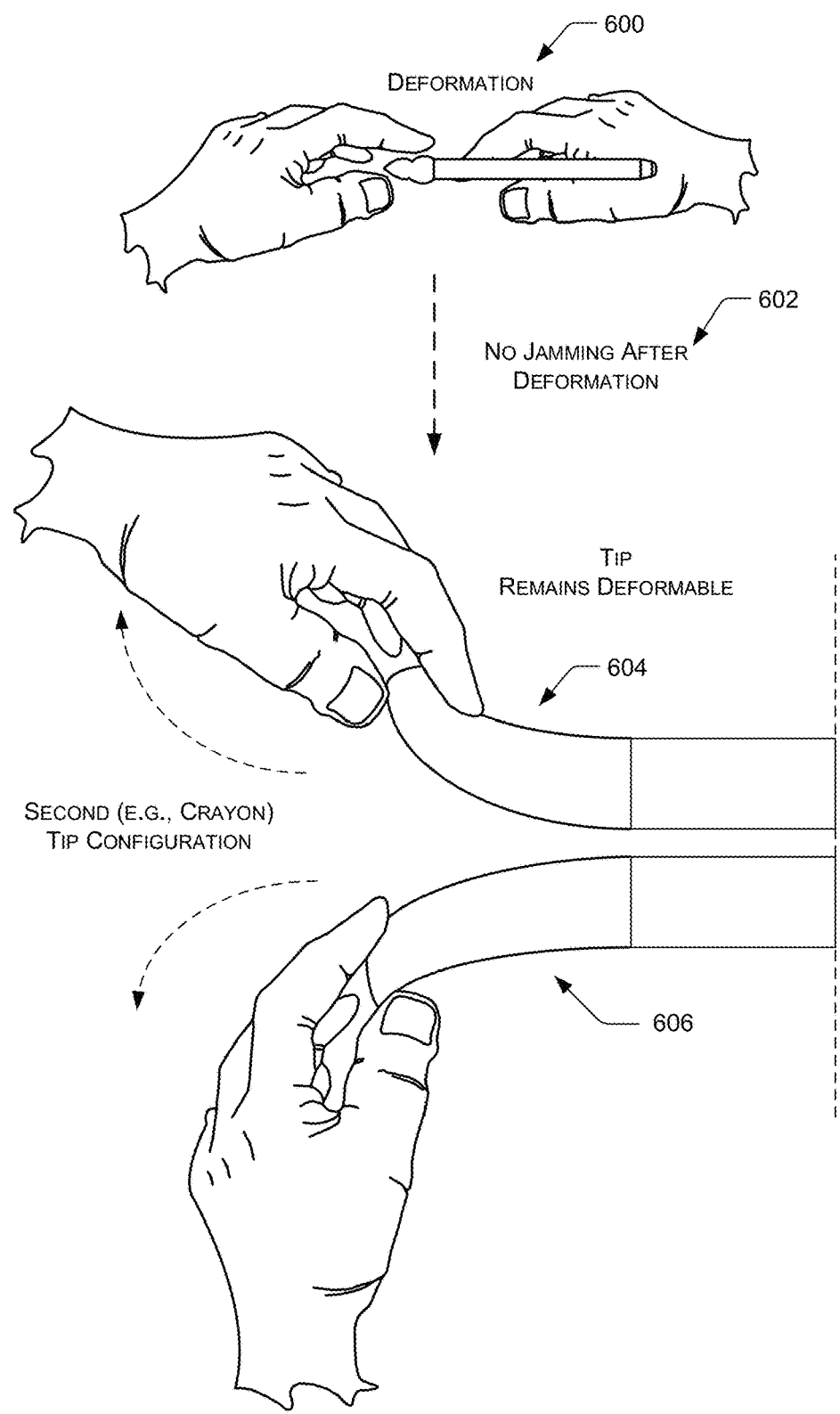
FIG. 6 illustrates an example of a tip shape that remains deformable, according to some implementations.

FIG. 6 illustrates an example of the deformable tip 104 remaining in a deformable state in the Chinese brush tip configuration 108. As shown at 600, the user may deform the deformable tip 104. As shown at 602, no jamming (or only partial jamming) may occur after deformation of the deformable tip 104. Further, in the illustrative side views shown at 604 and at 606, the deformable tip 104 remains deformable in multiple directions. For example, as described above with respect to FIG. 2, the first valve 214 may remain open to air such that the deformable tip 104 remains deformable.

Figure 7:
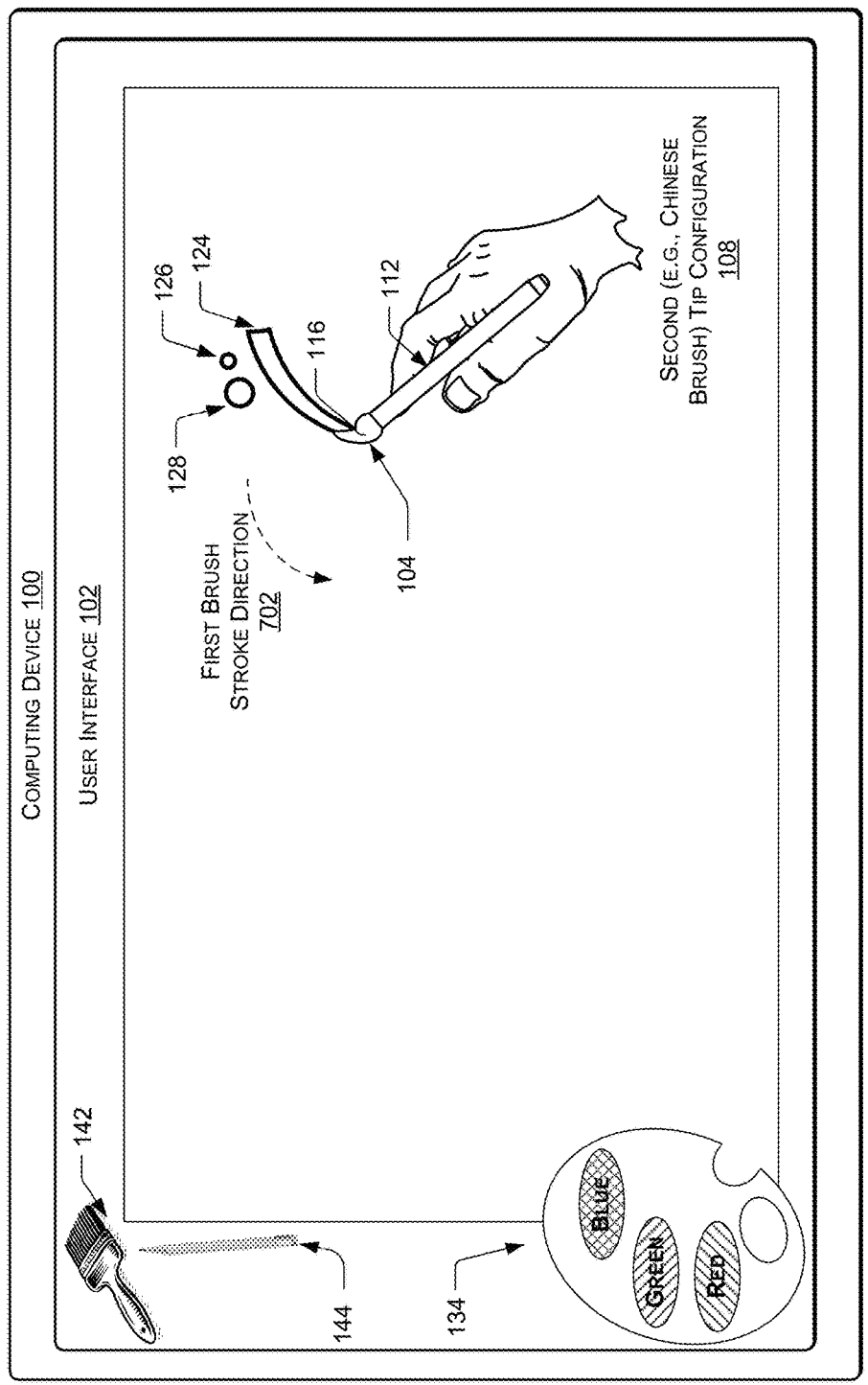
FIGS. 7 and 8 illustrate user interactions with the exemplary user interface with an input device having a tip shape that remains deformable (e.g., a Chinese brush tip configuration), according to some implementations.

FIG. 7 illustrates that when the user orients the stylus 112 such that Chinese brush tip shape 116 defines a contact area and moves the stylus 112 in a first brush stroke direction 702, the variable stroke pattern 124 may be created.

Figure 8:
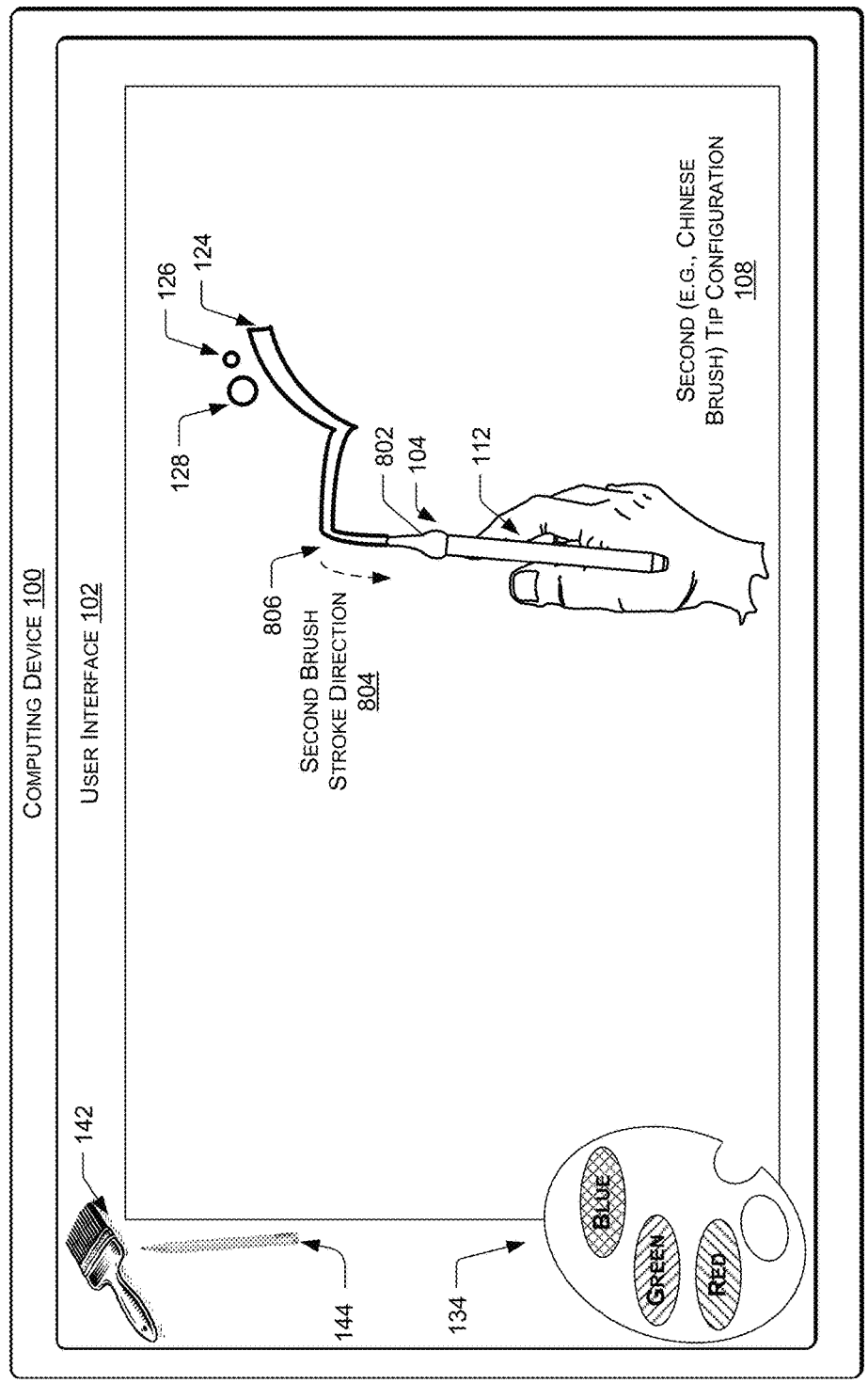

FIG. 8 illustrates that when the user orients the stylus 112 in a different orientation, a different Chinese brush tip shape 802 results that represents a different contact area. When the user moves the stylus 112 in a second brush stroke direction 804, a different stroke pattern 806 may be created.

FIGS. 7 and 8 further illustrate that, as the deformable tip 104 remains flexible in the Chinese brush tip configuration 108, multiple other stroke patterns may be possible. For example, by touching the deformable tip 104 with a first amount of pressure (e.g., in a direction in which the stylus 112 is substantially perpendicular to a plane of a display), the small circle 126 may be created, while a larger amount of pressure may result in the larger circle 128.

Figure 9:
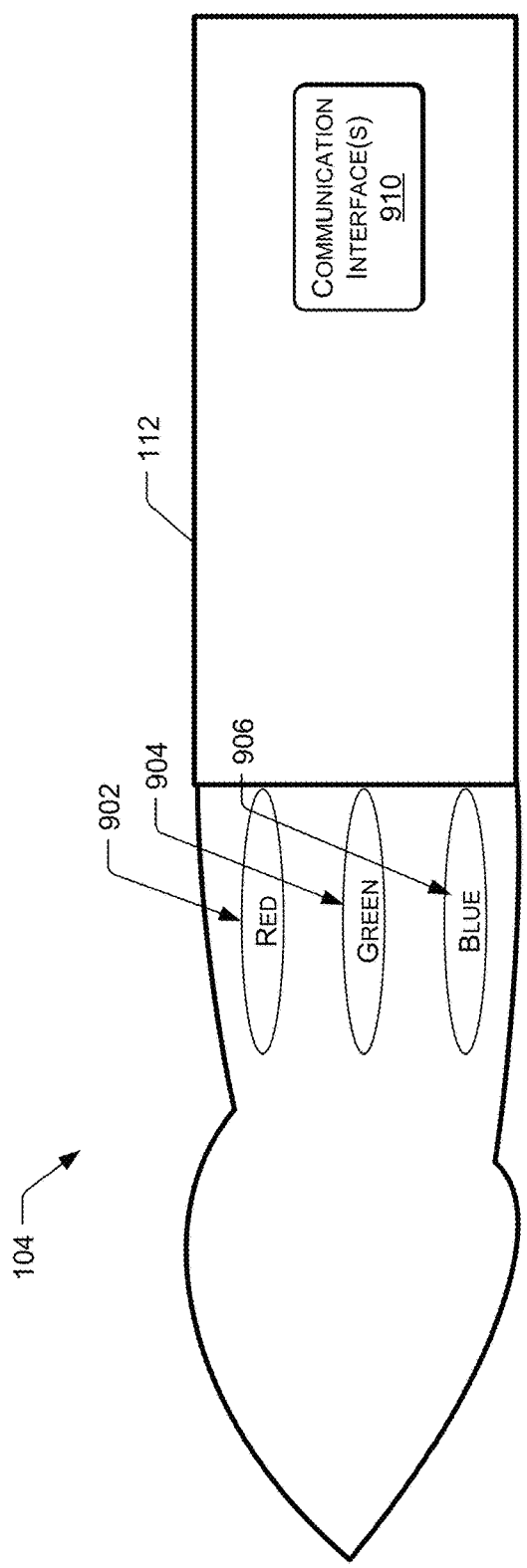
FIG. 9 illustrates an example of an input device that includes multiple light sources that may be illuminated based on a color selected via a user interface, according to some implementations.

FIG. 9 illustrates an example implementation in which at least a portion of the deformable shape tip 104 may be illuminated using a plurality of light sources (e.g., light emitting diodes). In FIG. 9, the plurality of light sources include a red light source 902, a green light source 904, and a blue light source 906. However, an alternative number of light sources may be provided. Further, one or more communication interfaces 910 may be used to communicate with the computing device 100 (e.g., a wireless or wired communication interface to receive information associated with one or more colors selected from the color palette 134).

Figure 10:
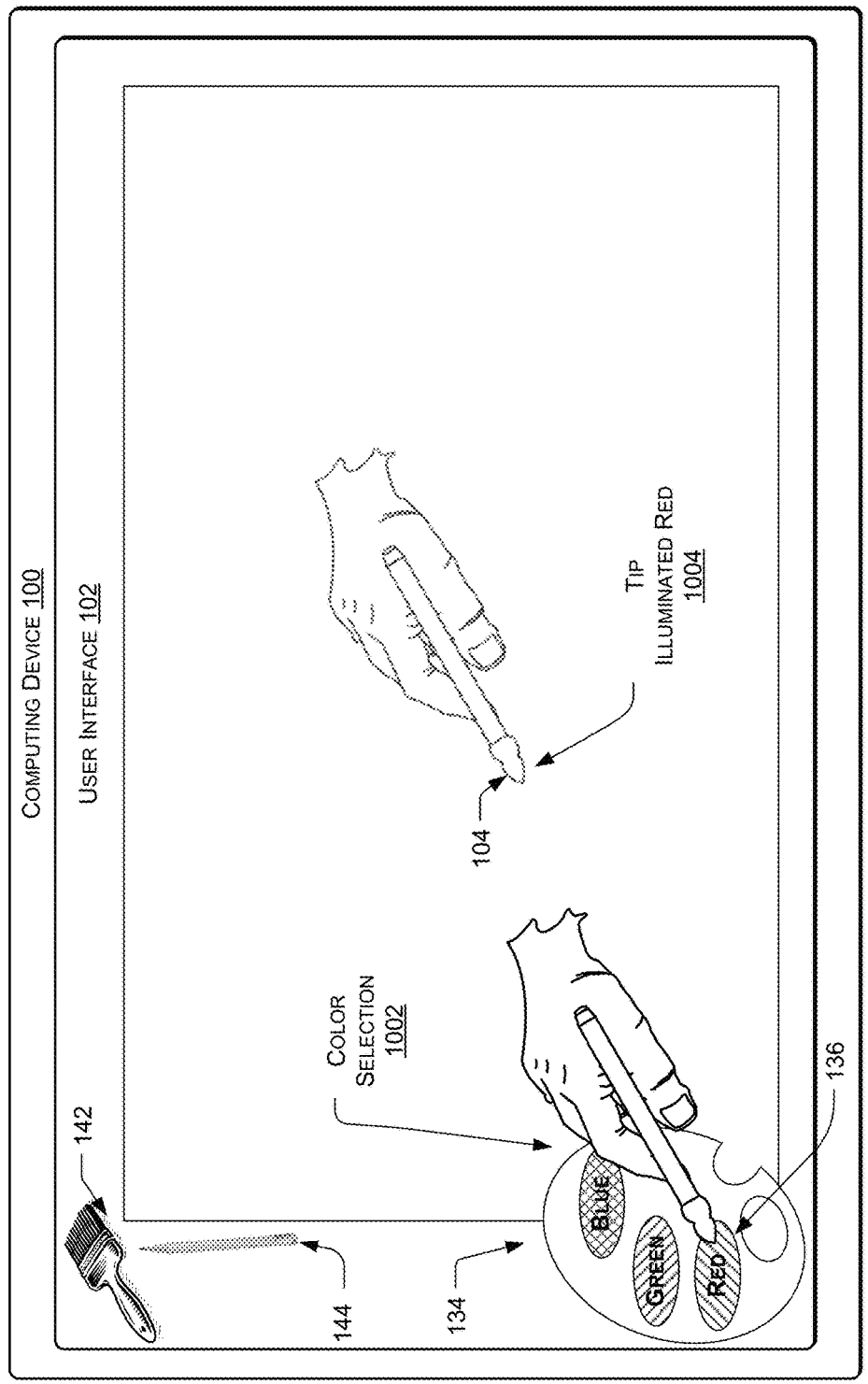
FIGS. 10-12 illustrate examples of illumination of a portion of an input device based on a color selected via a user interface, according to some implementations.
Figure 11:
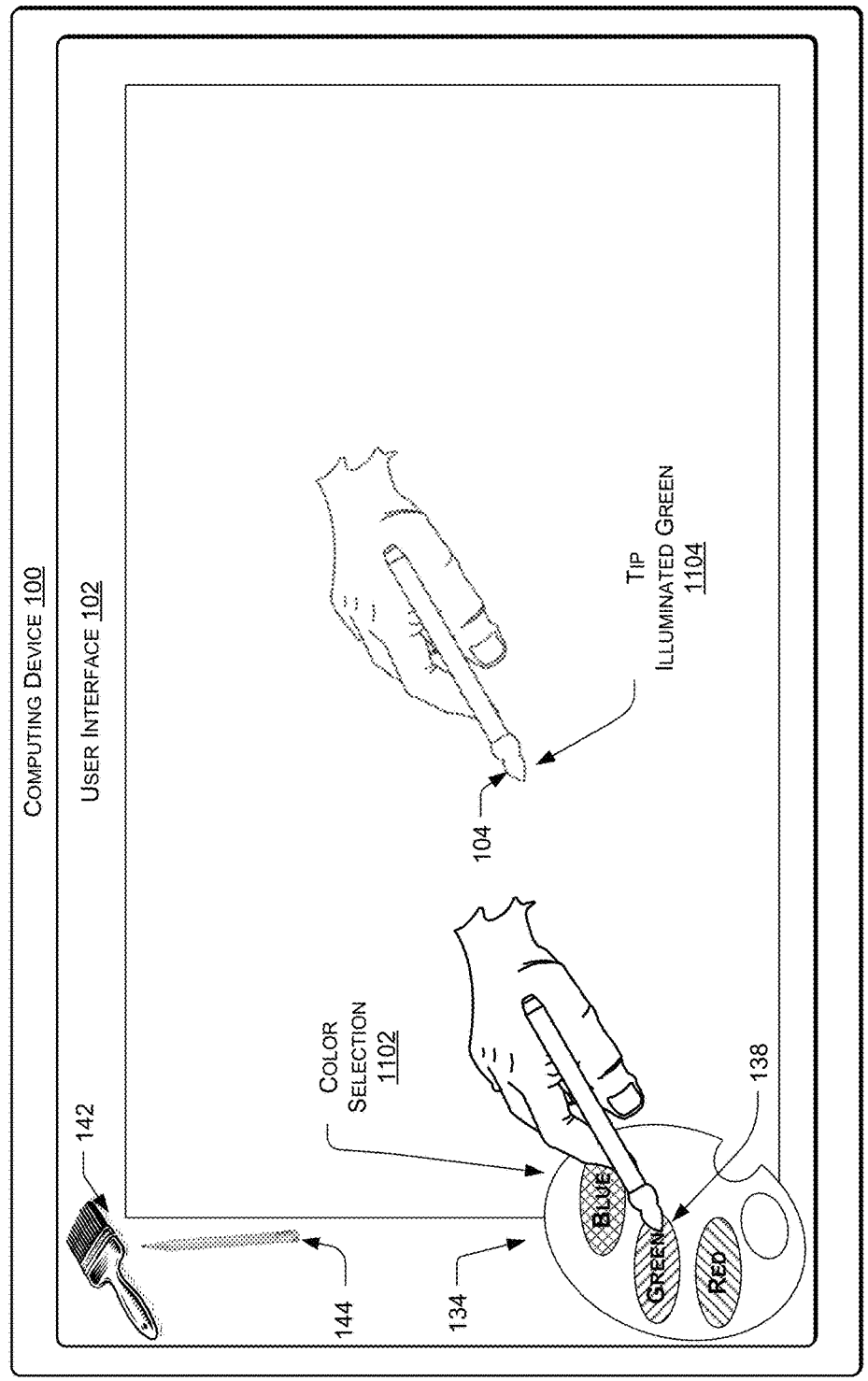
Figure 12:
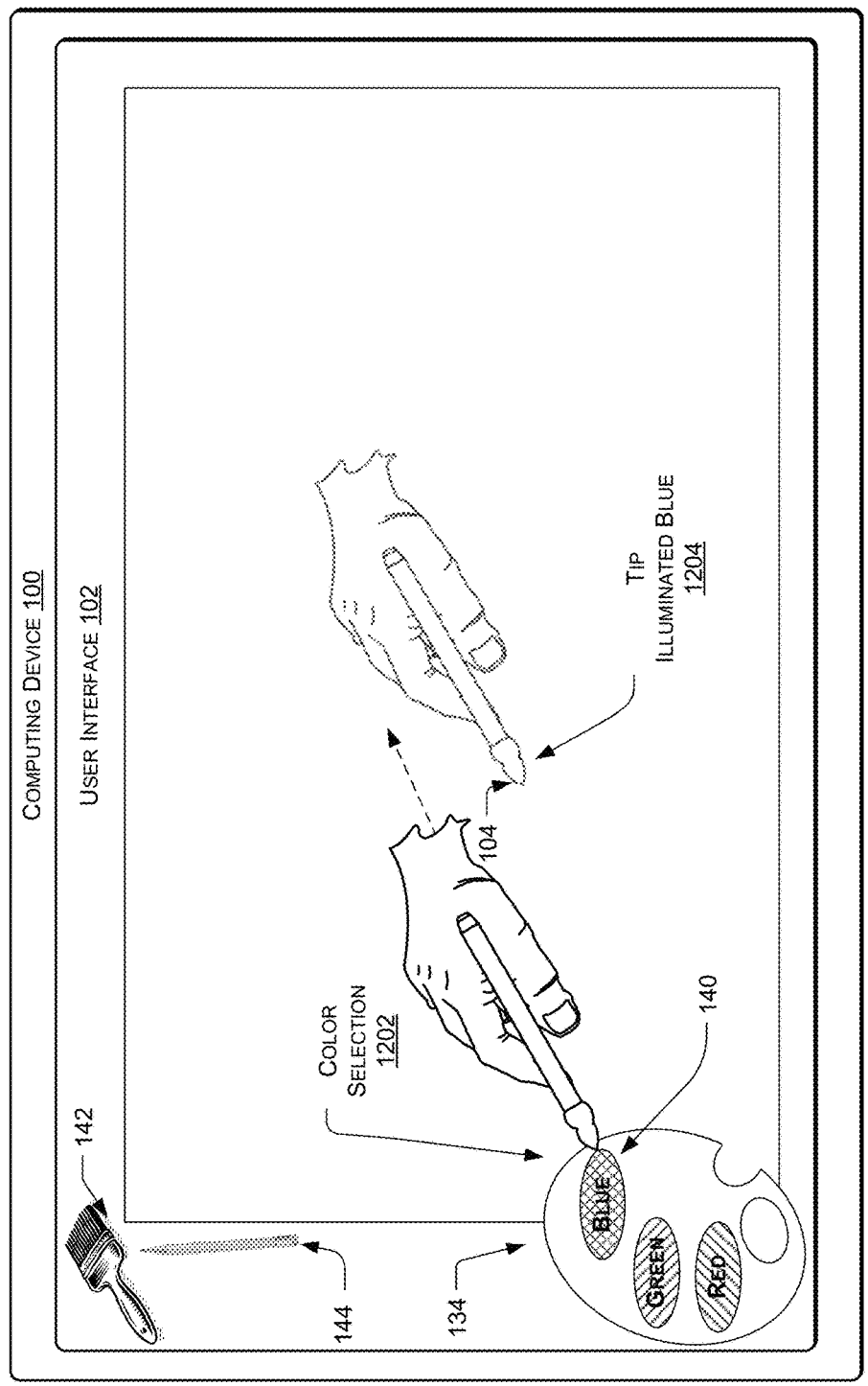

FIGS. 10-12 illustrate examples of illumination of at least a portion of the deformable tip 104 using one or more of the light sources. Referring to FIG. 10, a color selection 1002 may include the user selecting the red color 136 from the color palette 134. As shown at 1004, selection of the red color 136 may result in at least a portion of the tip 104 being illuminated red. Referring to FIG. 11, a color selection 1102 may include the user selecting the green color 138 from the color palette 134. As shown at 1104, selection of the green color 138 may result in at least a portion of the tip 104 being illuminated green. Referring to FIG. 12, a color selection 1202 may include the user selecting the blue color 140 from the color palette 134. As shown at 1204, selection of the blue color 140 may result in at least a portion of the tip 104 being illuminated blue.

While not illustrated in FIGS. 10-12, the tip 104 may be illuminated using a combination of at least two of the light sources 136-140. In some cases, the combination of light sources may represent RGB values resulting from the user selecting multiple colors from the color palette 134. Further, a brightness of each of the light sources may be adjusted to provide for multiple color combinations.

As an illustrative example, after the user selects the red color 136 from the color palette 134 in FIG. 10, the user may then select the green color 138 from the color palette 134 in FIG. 11. Accordingly, both the red light source 902 and the green light source 904 may be illuminated. Further, the brightness of both the red light source 902 and the green light source 904 may be controlled such that a range of colors associated with various combinations of red and green light are possible.

As another example, after the user selects the red color 136 from the color palette 134 in FIG. 10 and selects the green color 138 from the color palette 134 in FIG. 11, the user may then select the blue color 140 from the color palette 134 in FIG. 12. Accordingly, the red light source 902, the green light source 904, and the blue light source 906 may be illuminated. Further, the brightness of the red light source 902, the green light source 904, and the blue light source 906 may be controlled such that a range of colors associated with various combinations of red, green and blue light are possible.

Various other sequences of user selection of colors may be possible, and the resulting color combination may be determined accordingly. For example, the user may select the red color 136 from the color palette 134 in FIG. 10 and then select the blue color 140 from the color palette 134 in FIG. 12. The resulting color combination may represent a combination of red and blue colors. As another example, the user may select the green color 138 from the color palette 134 in FIG. 11 and then select the blue color 140 from the color palette 134 in FIG. 12. The resulting color combination may represent a combination of green and blue colors.

In some cases, the user may select the same color more than once, and the resulting brightness of each selected color may be adjusted accordingly. As an illustrative non-limiting example, the user may select the red color 136 from the color palette 134 in FIG. 10, resulting in the illumination of the red light source 902 at a first brightness level. The user may then select the green color 138 from the color palette 134 in FIG. 11, resulting in the illumination of the green light source 904 at a first brightness level. The user may then select the red color 136 again, resulting in an increase in the illumination of the red light source 902 from the first brightness level to a second brightness level. Thus, multiple combinations of brightness levels of each of the light sources 902-906 may allow for a wide range of color combinations.

Figure 13:
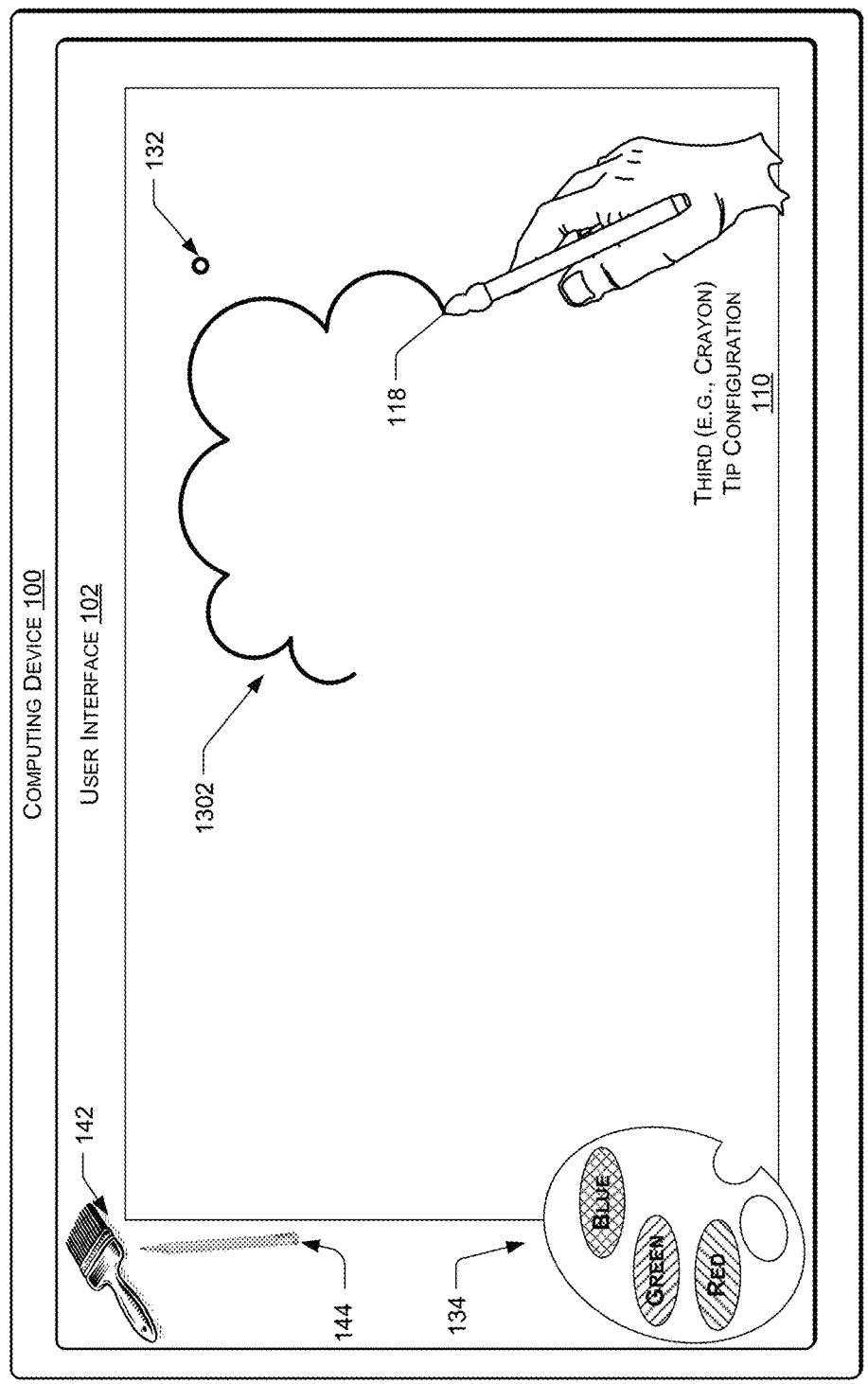
FIG. 13 illustrates user interaction with the exemplary user interface with an input device having a tip shape that has been jammed but not deformed (e.g., a crayon tip configuration), according to some implementations.

FIG. 13 illustrates an example of a stroke pattern 1302 that may be created when the deformable tip 104 is in the third tip configuration 110 (e.g., the crayon configuration). That is, in FIG. 13, the deformable tip 104 may be jammed but may not be deformed. FIG. 13 illustrates that in the third tip configuration 110, the rigid crayon tip shape 118 may produce a fixed shape pattern (e.g., a line with a fixed stroke pattern width) and only a fixed sized circle 132.

Figure 14:
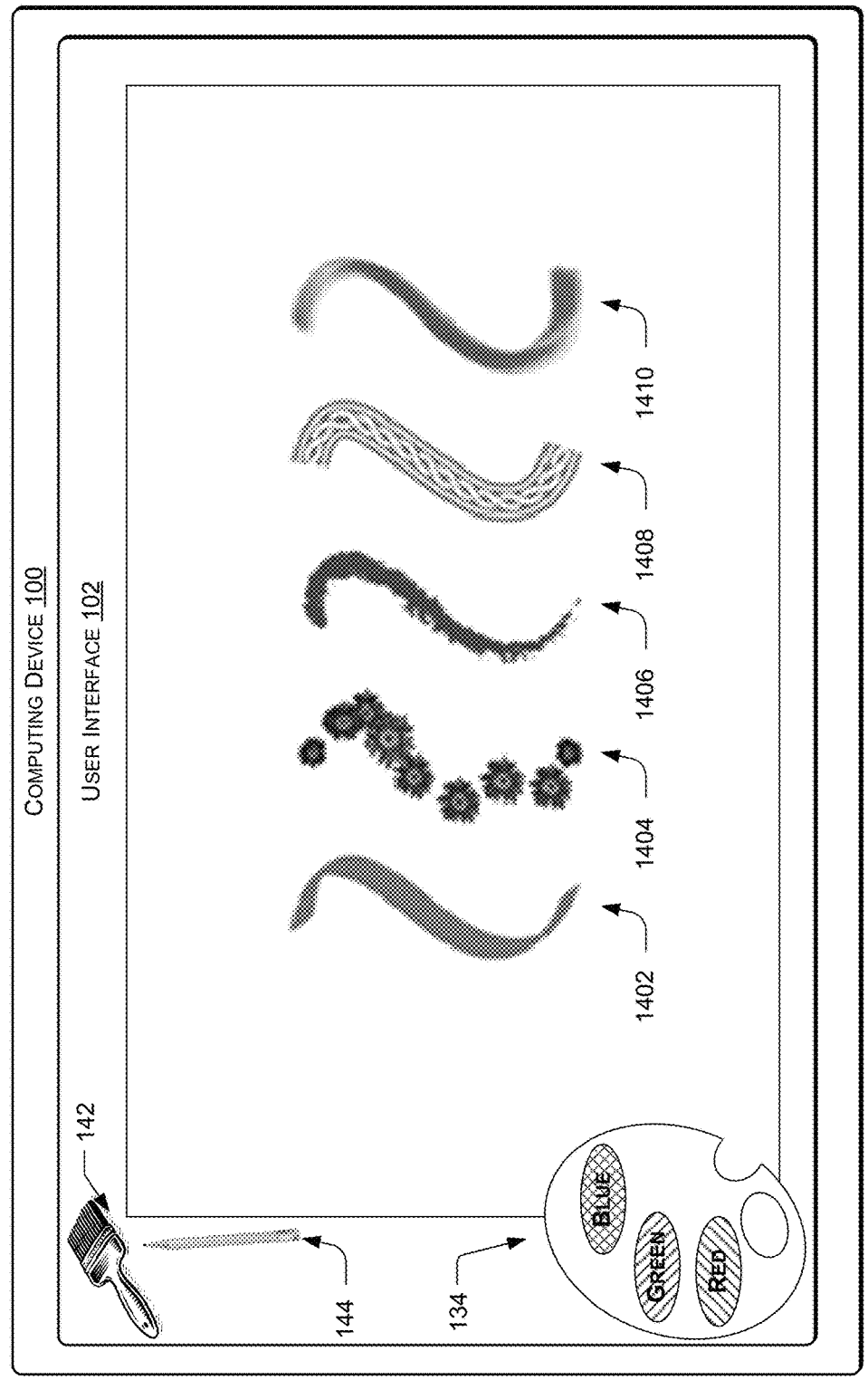
FIG. 14 illustrates an example in which a deformable shape tip may allow the user to stylize an appearance of a path, according to some implementations.

FIG. 14 illustrates a particular implementation in which the deformable tip 104 may allow the user to stylize the appearance of paths. In the example of FIG. 14, the various stylized brush patterns include a first brush pattern 1402, a second brush pattern 1404, a third brush pattern 1406, a fourth brush pattern 1408, and a fifth brush pattern 1410. However, various other stylized brush patterns may be possible. Various user-defined characteristics of a brush pattern, such as size, shape and color may be saved by the computing device 100. The saved brush pattern may be used to evenly fill the brush path with a stylized brush pattern along a length of the drawing path.

Figure 16:
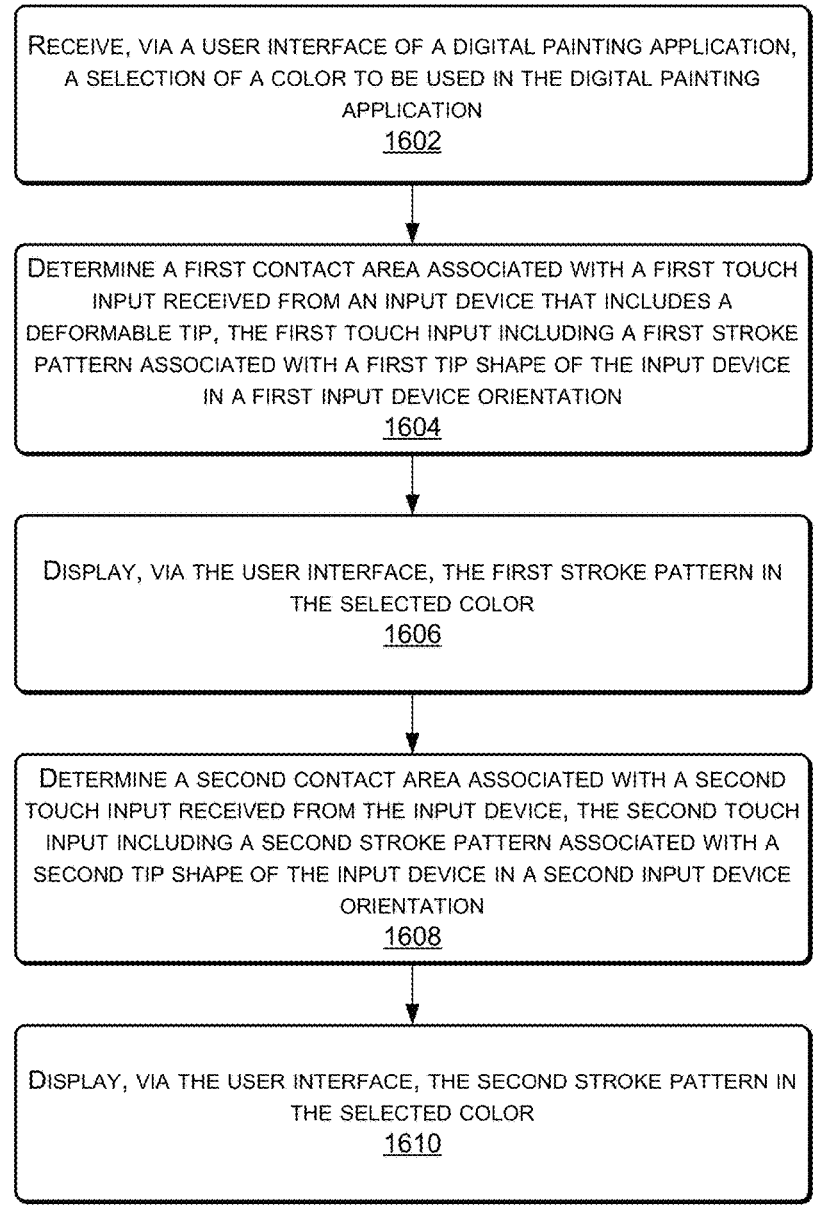
FIG. 16 illustrates an example process flow for determining various stroke patterns and displaying the associated stroke patterns in a user selected color, according to some implementations.

FIGS. 15-17 illustrate example process flows according to some implementations. In the flow diagrams of FIGS. 15-17, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. Numerous other variations will be apparent to those of skill in the art in light of the disclosure herein. For discussion purposes, the process flows in FIGS. 15-17 are described with reference to FIGS. 1-14, described above, although other models, frameworks, systems and environments may implement the illustrated process.

Referring to FIG. 15, an example process flow is illustrated and generally designated 1500. At block 1502, the process flow 1500 includes receiving, via a user interface of a digital painting application, a selection of a color to be used in the digital painting application. For example, referring to FIGS. 10-12, a user may select the red color 136, the green color 138, the blue color 140, or a combination thereof via the color palette 134.

At block 1504, the process flow 1500 includes providing information associated with the selected color to an input device that includes a deformable shape tip. At least a portion of the deformable shape tip is to be illuminated in the selected color in response to the input device receiving the information associated with the selected color.

For example, referring to FIG. 10, the computing device 100 may provide information to the input device (e.g., via the one or more communication interfaces 910 illustrated in FIG. 9) in response to the color selection at 1002, such that at least a portion of the tip 104 is illuminated red at 1004. As another example, referring to FIG. 11, the computing device 100 may provide information to the input device in response to the color selection at 1102, such that at least a portion of the tip 104 is illuminated green at 1104. As a further example, referring to FIG. 12, the computing device 100 may provide information to the input device in response to the color selection at 1202, such that at least a portion of the tip 104 is illuminated blue at 1204.

Referring to FIG. 16, an example process flow is illustrated and generally designated 1600. At block 1602, the process flow 1600 includes receiving, via a user interface of a digital painting application, a selection of a color to be used in the digital painting application. For example, referring to FIGS. 10-12, a user may select the red color 136, the green color 138, the blue color 140, or a combination thereof via the color palette 134.

At block 1604, the process 1600 includes determining a first contact area associated with a first touch input received from an input device that includes a deformable shape tip. The first touch input includes a first stroke pattern associated with a first tip shape of the input device in a first input device orientation. For example, referring to FIG. 4, the first touch input may include the first stroke pattern 120 associated with the first tip shape 114(1) in a first input device orientation (e.g., when the oil brush is oriented with the "wide" side of the brush tip in contact with a touch screen).

At block 1606, the process 1600 includes displaying, via the user interface, the first stroke pattern in the selected color. For example, referring to FIG. 4, the first stroke pattern 120 may be illuminated based on one or more colors selected from the color palette 134.

At block 1608, the process 1600 includes determining a second contact area associated with a second touch input received from the input device. The second touch input includes a second stroke pattern associated with a second tip shape of the input device in a second input device orientation. For example, referring to FIG. 5, the second touch input may include the second stroke pattern 122 associated with the second tip shape 114(2) in a first input device orientation (e.g., when the oil brush is oriented with the "narrow" side of the brush tip in contact with a touch screen).

At block 1610, the process 1600 includes displaying, via the user interface, the second stroke pattern in the selected color. For example, referring to FIG. 5, the second stroke pattern 122 may be illuminated based on one or more colors selected from the color palette 134.

Referring to FIG. 17, an example process flow is illustrated and generally designated 1700. At block 1702, the process flow 1700 includes receiving, at an input device including a deformable tip, an input to adjust a hardness of the deformable tip. In some cases, the input to adjust the hardness of the deformable tip may include actuation of a switch of the input device to activate a vacuum pump. For example, referring to FIG. 2, the user may toggle or otherwise select the switch 218 to activate the vacuum pump 210 in order to adjust the deformable tip 104 from the unjammed configuration 202 to the jammed configuration 204. Alternatively, while not shown in FIG. 2, the hardness of the deformable tip 104 may be adjusted using a magnetic component, a mechanical component, or a robotic component, among other alternatives.

At block 1704, the process flow 1700 includes adjusting the hardness of the deformable tip from a first tip configuration to a second tip configuration that is more rigid than the first tip configuration in response to receiving the input at 1702. For example, referring to FIG. 2, the vacuum pump 210 may remove a gas from within the membrane 206 such that the plurality of solid particles 208 within the membrane 206 are more tightly packed within the membrane 206.

In some implementations, a second input may be received to adjust the hardness of the deformable tip 104 from the second tip configuration (e.g., the jammed tip configuration 204) to a third tip configuration that is more rigid than the second tip configuration. That is, while not shown in the example of FIG. 2, the vacuum pump 210 may remove more gas from within the membrane 206 such that the particles 208 are more tightly packed within the membrane 206 than in the jammed configuration 204 that is illustrated in FIG. 2.

The process flows 1500, 1600 and 1700 illustrated in FIGS. 15-17 are merely example process flows. In other examples, the operations/blocks may be rearranged, combined, modified, or omitted without departing from the disclosure.

Example Computing Device and Environment

Figure 18:
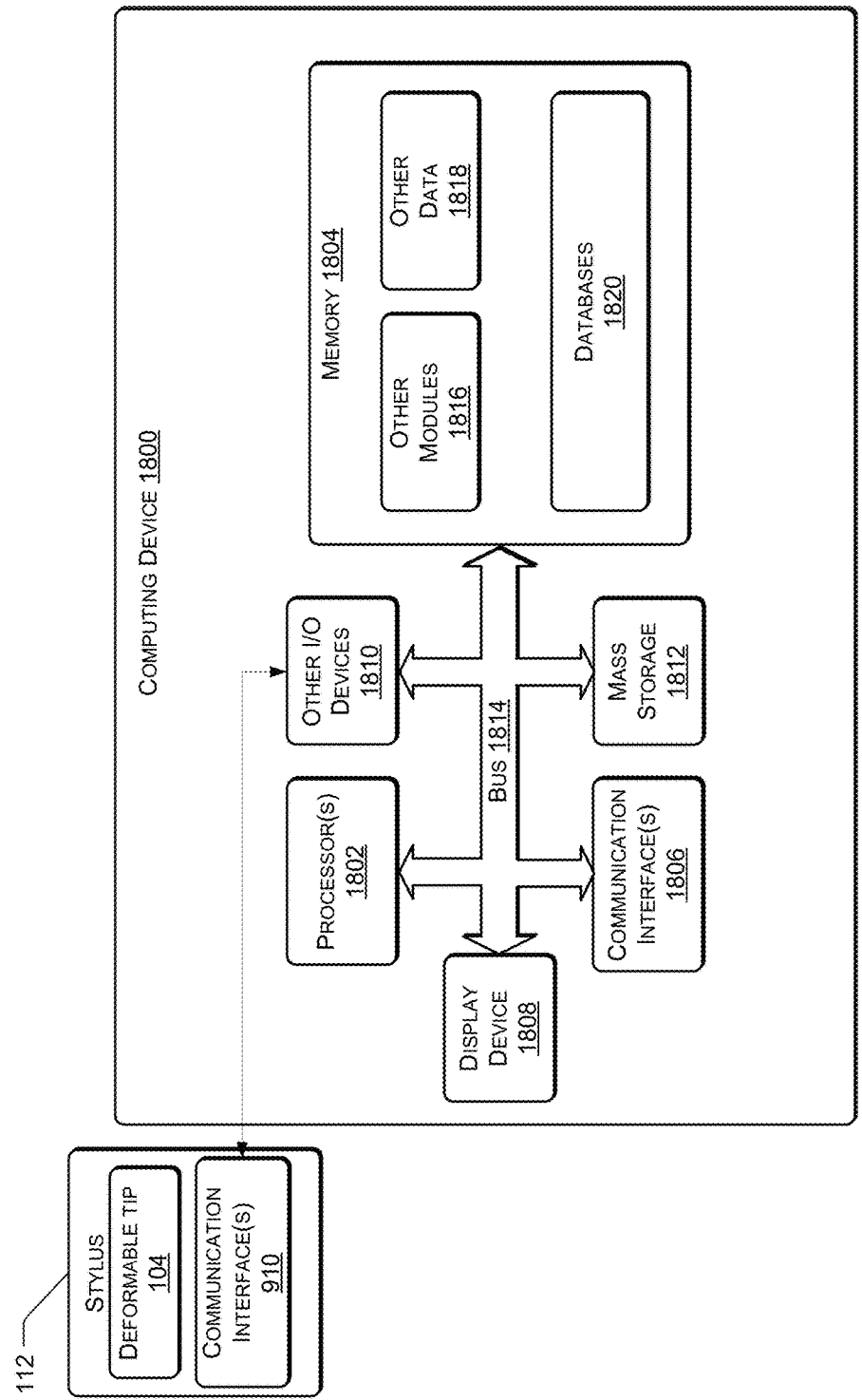
FIG. 18 illustrates an example system in which some implementations may operate.

FIG. 18 illustrates an example configuration of a computing device 1800 and an environment that can be used to implement the modules and functions described herein. It should be understood that the computing device 1800 may be configured in a similar manner to that illustrated. In some implementations, the computing device 1800 of FIG. 18 may correspond to the computing device 100 in FIG. 1.

The computing device 1800 may include at least one processor 1802, a memory 1804, communication interfaces 1806, a display device 1808 (e.g. a touchscreen display), other input/output (I/O) devices 1810 (e.g. a touchscreen display or a mouse and keyboard), and one or more mass storage devices 1812, able to communicate with each other, such as via a system bus 1814 or other suitable connection.

In the example of FIG. 18, the stylus 112 (including the deformable tip 104) is illustrated as a separate device that may be communicatively coupled to the computing device 1800 via a wired or wireless connection. As an illustrative example, the computing device 1800 may communicate with the stylus 112 via the one or more communication interfaces 910, as illustrated in the example of FIG. 9.

The processor 1802 may be a single processing unit or a number of processing units, all of which may include single or multiple computing units or multiple cores. The processor 1802 can be implemented as one or more microprocessors, microcomputers, microcontrollers, digital signal processors, central processing units, state machines, logic circuitries, and/or any devices that manipulate signals based on operational instructions. Among other capabilities, the processor 1802 can be configured to fetch and execute computer-readable instructions stored in the memory 1804, mass storage devices 1812, or other computer-readable media.

Memory 1804 and mass storage devices 1812 are examples of computer storage media for storing instructions which are executed by the processor 1802 to perform the various functions described above. For example, memory 1804 may generally include both volatile memory and non-volatile memory (e.g., RAM, ROM, or the like). Further, mass storage devices 1812 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 1804 and mass storage devices 1812 may be collectively referred to as memory or computer storage media herein, and may be computer-readable media capable of storing computer-readable, processor-executable program instructions as computer program code that can be executed by the processor 1802 as a particular machine configured for carrying out the operations and functions described in the implementations herein.

The computing device 1800 may also include one or more communication interfaces 1806 for exchanging data with other devices, such as via a network, direct connection, or the like, as discussed above. The communication interfaces 1806 can facilitate communications within a wide variety of networks and protocol types, including wired networks (e.g., LAN, cable, etc.) and wireless networks (e.g., WLAN, cellular, satellite, etc.), the Internet and the like. Communication interfaces 1806 can also provide communication with external storage (not shown), such as in a storage array, network attached storage, storage area network, or the like.

The discussion herein refers to data being sent and received by particular components or modules. This should not be taken as a limitation as such communication need not be direct and the particular components or module need not necessarily be a single functional unit. This is not to be taken as limiting implementations to only those in which the components directly send and receive data from one another. The signals could instead be relayed by a separate component upon receipt of the data. Further, the components may be combined or the functionality may be separated amongst components in various manners not limited to those discussed above. Other variations in the logical and practical structure and framework of various implementations would be apparent to one of ordinary skill in the art in view of the disclosure provided herein.

A display device 1808, such as touchscreen display or other display device, may be included in some implementations. The display device 1808 may be configured to display the user interface 100 as described above. Other I/O devices 1810 may be devices that receive various inputs from a user and provide various outputs to the user, and may include a touchscreen, such as a touchscreen display, a keyboard, a remote controller, a mouse, a printer, audio input/output devices, and so forth.

Memory 1804 may include modules and components for execution by the computing device 1800 according to the implementations discussed herein. Memory 1804 may further include one or more other modules 1816, such as an operating system, drivers, application software, communication software, or the like. Memory 1804 may also include other data 1818, such as data stored while performing the functions described above and data used by the other modules 1816. Memory 1804 may also include other data and data structures described or alluded to herein.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As used herein, "computer-readable media" includes computer storage media and communication media. Computer storage media includes volatile and non-volatile, removable and non-removable media implemented in any method or technology for storage of information, such as computer readable instructions, data structures, program modules, or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave. As defined herein, computer storage media does not include communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. An input device comprising:
a deformable tip that is adjustable from a first tip configuration to a second tip configuration that is more rigid than the first tip configuration; and
a hardness adjusting component operable to change an arrangement of components within the deformable tip and to transition the deformable tip between the first tip configuration and the second tip configuration.

2. The input device as recited in claim 1, wherein:
the deformable tip comprises a membrane and a plurality of solid particles disposed within the membrane;
the first tip configuration includes an unjammed tip configuration in which the plurality of solid particles are arranged within the membrane such that the deformable tip is adjustable;
the second tip configuration includes a jammed tip configuration in which the plurality of solid particles are more tightly packed within the membrane than in the unjammed configuration.

3. The input device as recited in claim 2, wherein the hardness adjusting component includes a vacuum pump to remove a gas from within the membrane to transition the deformable tip from the unjammed tip configuration to the jammed tip configuration.

4. The input device as recited in claim 1, wherein the hardness adjusting component includes at least one of a magnetic component that is actuatable to adjust the rigidity of the deformable tip, a mechanical component that is actuatable to adjust the rigidity of the deformable tip, or a robotic component that is actuatable to adjust the rigidity of the deformable tip.

5. The input device as recited in claim 1, wherein the deformable tip is manually deformable.

6. The input device as recited in claim 1, wherein the second tip configuration is an oil brush tip configuration.

7. The input device as recited in claim 6, wherein the oil brush tip configuration includes:
a first oil brush tip shape to create a first stroke pattern in a first input device orientation; and
a second oil brush tip shape to create a second stroke pattern in a second input device orientation, wherein the second stroke pattern is different from the first stroke pattern.

8. The input device as recited in claim 7, wherein the first stroke pattern is wider than the second stroke pattern.

9. The input device as recited in claim 1, wherein the second tip configuration is a crayon tip configuration.

10. The input device as recited in claim 1, further comprising a plurality of light sources to illuminate at least a portion of the deformable tip, each respective light source associated with a particular color.

11. The input device as recited in claim 10, wherein the plurality of light sources include at least a red light source, a green light source, and a blue light source.

12. A method comprising:
under control of one or more processors,
receiving, at an input device including a deformable tip, an input to adjust a hardness of the deformable tip;
in response to receiving the input, adjusting the hardness of the deformable tip, using a hardness adjusting component to arrange components within the deformable tip to change the deformable tip from a first tip configuration to a second tip configuration that is more rigid than the first tip configuration.

13. The method as recited in claim 12, wherein the input to adjust the hardness of the deformable tip includes actuation of a switch of the input device to activate a vacuum pump.

14. The method as recited in claim 12, wherein adjusting the hardness of the deformable tip includes removing a gas from within a membrane that includes a plurality of solid particles within the membrane such that the plurality of solid particles are more tightly packed within the membrane.

15. The method as recited in claim 12, further comprising:
receiving, at the input device, a second input to adjust the hardness of the deformable tip from the second tip configuration to a third tip configuration; and
in response to receiving the second input, adjusting the hardness of the deformable tip from the second tip configuration to a third tip configuration that is more rigid than the second tip configuration.

16. The method as recited in claim 12, further comprising:
receiving, at the input device, a second input to adjust a color of the deformable tip to a first color; and
in response to receiving the second input, illuminating at least a portion of the deformable tip in the first color.

17. The method as recited in claim 16, wherein the second input is received from a computing device via a wireless connection or a wired connection in response to selection of the first color by the input device via a user interface displayed on the computing device.

18. One or more computer readable media maintaining instructions that, when executed by one or more processors, cause the one or more processors to perform acts comprising:
receiving, via a user interface of a digital painting application, a selection of a color to be used in the digital painting application;
determining a first contact area associated with a first touch input received from an input device that includes a deformable tip, the first touch input including a first stroke pattern associated with a first tip shape of the input device in a first input device orientation;
displaying, via the user interface, the first stroke pattern in the selected color;
determining a second contact area associated with a second touch input received from the input device, the second touch input including a second stroke pattern associated with a second tip shape of the input device in a second input device orientation, the second tip shape changed from the first tip configuration using a hardness adjusting component operable to change an arrangement of components within the deformable tip and, and the second tip shape being more rigid than the first tip shape; and displaying, via the user interface, the second stroke pattern in the selected color.

19. The one or more computer readable media as recited in claim 18, wherein the first contact area and the second contact area are determined using one or more infrared cameras.

20. The one or more computer readable media as recited in claim 18, the acts further comprising:

displaying, via the user interface of the digital painting application, a color palette including a plurality of selectable colors, wherein the selected color includes one or more colors selected from the color palette via one or more touch inputs received from the input device.

* * * * *